(12) United States Patent
Takagi et al.

(10) Patent No.: US 6,496,455 B1
(45) Date of Patent: Dec. 17, 2002

(54) RECORDING DEFECT SUBSTITUTION METHOD FOR A DISC-SHAPED RECORDING MEDIUM, AND A RECORDING AND REPRODUCING APPARATUS FOR A DISC-SHAPED RECORDING MEDIUM

(75) Inventors: Yuji Takagi, Hirakata (JP); Takahiro Nagai, Osaka (JP); Yoshihisa Fukushima, Osaka (JP); Shunji Ohara, Higashiosaka (JP); Isao Satoh, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 202 days.

(21) Appl. No.: 09/598,221

(22) Filed: Jun. 21, 2000

Related U.S. Application Data

(62) Division of application No. 09/142,910, filed as application No. PCT/JP97/00865 on Mar. 18, 1997, now Pat. No. 6,134,214.

(30) Foreign Application Priority Data

Mar. 18, 1996 (JP) .............................. 8-060524

(51) Int. Cl.⁷ ................................................ G11B 7/00
(52) U.S. Cl. ................................ 369/47.14; 369/53.15; 369/15.17
(58) Field of Search .......................... 369/47.1, 47.11, 369/47.14, 47.17, 53.1, 53.11, 53.12, 53.13, 53.15, 53.17, 59.1

(56) References Cited

U.S. PATENT DOCUMENTS

| | | |
|---|---|---|
| 4,152,695 A | 5/1979 | Democrate et al. |
| 4,814,903 A | 3/1989 | Kulakowski et al. |
| 5,237,553 A | 8/1993 | Fukushima et al. |
| 5,528,571 A | 6/1996 | Funahashi et al. |
| 5,805,547 A | 9/1998 | Yamamuro |
| 5,859,823 A | 1/1999 | Yamamuro |
| 5,956,309 A | 9/1999 | Yamamuro |
| 5,963,522 A | 10/1999 | Yamamuro |
| 5,982,729 A | 11/1999 | Yamamuro |
| 6,377,524 B1 * | 4/2002 | Ko ........................... 369/47.14 |
| 6,385,148 B2 * | 5/2002 | Ito et al. .................. 369/47.14 |

FOREIGN PATENT DOCUMENTS

| | | |
|---|---|---|
| EP | 271335 A2 | 6/1988 |
| EP | 464811 A2 | 1/1992 |
| JP | 60-202573 | 10/1985 |
| JP | 63-13171 | 1/1988 |
| JP | 1-307063 | 12/1989 |
| JP | 3-41673 | 2/1991 |
| JP | 3-205661 | 9/1991 |
| JP | 3-266264 | 11/1991 |
| JP | 4-28061 | 1/1992 |
| JP | 4-229465 | 8/1992 |
| JP | 6-243591 | 9/1994 |
| JP | 9-259538 | 10/1997 |
| WO | 96/27882 | 9/1996 |

OTHER PUBLICATIONS

J.R. Watkinson, "Data Integrity in Disc Drives", Wireless World, Jan. 1983, UK, vol. 89, No. 1564, pp. 76–78.

* cited by examiner

Primary Examiner—Muhammad Edun
(74) Attorney, Agent, or Firm—Wenderoth, Lind & Ponack, L.L.P.

(57) ABSTRACT

In a recording and reproducing apparatus for a disc-shaped recording medium, and a defect substitution method for a disc-shaped recording medium, whether reproduction of recorded data is good is determined by sector unit and not by product code unit, defective sector discrimination is performed by sector unit, and only sectors determined defective are alternately recorded, when using a recording format in which data that is error detection and correction coded with a product code is segmented and recorded to a plurality of sectors.

7 Claims, 15 Drawing Sheets

RECORDING DEFECT SUBSTITUTION METHOD FOR A DISC-SHAPED RECORDING MEDIUM, AND A RECORDING AND REPRODUCING APPARATUS FOR A DISC-SHAPED RECORDING MEDIUM

This is a Rule 1.53(b) Divisional application of Ser. No. 09/142,910, filed Sep. 18, 1998, filed as PCT/JP97/00865, filed Mar. 18, 1997 now U.S. Pat. No. 6,134,214.

FIELD OF THE INVENTION

The present invention relates to a defect substitution method of a disc-shaped recording medium having a sector structure, and to an apparatus for recording and reproducing data on a disc-shaped recording medium using said defect substitution method, and more specifically relates to an optical disc defect management method of an optical disc in a recording system in which error detection and correction coding spans a plurality of sectors, and to an optical disc recording and reproducing apparatus.

DESCRIPTION OF THE PRIOR ART

High speed random access is possible with disc-shaped recording media, and a high recording density can be achieved by formatting a disc with a narrow data track pitch and bit pitch. Disc-shaped recording media can be generally categorized based on differences in the applicable recording method as either a magnetic disc or optical disc, and can be further classified as either a fixed type or removable type media based on differences in the method whereby the medium is mounted in the recording/reproducing apparatus during use. The smallest recording unit of the physical recording area to which data is generally recorded on disc-shaped recording media is called a "sector." Sectors that cannot be used for data storage also occur in disc-shaped recording media as a result of defects during manufacture or damage occurring after manufacture. In addition to data writing errors occurring as a result of writing data sectors that are defective as a result of damage to the disc-shaped recording medium itself, data writing errors attributable to the operating environment can also occur as described below.

Optical discs, of which the DVD is typical, have been widely used in recent years as a large capacity recording medium because of their high recording density. Further advances in recording density have also been achieved to further increase storage capacity. Optical discs, however, are typically manufactured from low rigidity materials such as polycarbonate, and even disc deflection resulting from the dead weight of the disc cannot be ignored. In addition, this type of optical disc is commonly used as a replaceable, removable recording medium. For use, the disc is inserted into a recording and reproducing apparatus and mounted on a rotating spindle, and the positioning precision of the disc therefore cannot be assured.

It is also common to directly insert optical discs into the recording and reproducing apparatus without housing the disc in a protective case. Even when used housed in such a protective case, however, the entire recording medium is exposed during recording and reproducing because the protective case is not airtight. That is, optical disc recording media have essentially no shielding against the ambient environment. It should be noted that the problems specific to optical recording media reside in the point that these media are different from the hard disc recording media, including both low recording density fixed discs and removable hard discs, which are also a magnetic storage medium.

In addition to problems associated with their rigidity, mounting precision, and low airtightness, when an optical disc recording medium is inserted into a recorder and recorded or played, normal recording and reproducing can be inhibited by variations in the relative position to the optical pickup, or by foreign matter in the air interfering with the laser from the optical pickup. In such cases, data reading and writing can be obstructed through a wide band of the recording area, and burst mode recording and reproduction errors occur easily, as a result of the narrow track pitch and dot pitch enabling high density recording, even if there are no disc defects or damage to the information sector of the optical disc recording medium. While such burst-mode recording and reproducing problems occur easily in optical disc recording media, they are also found in the above-noted magnetic recording media and are common to all types of disc-shaped recording medium.

"Recording defect" is a general term for the inability to record as a result of a defect or damage to the recording medium itself or the conditions under which the disc is used. If a recording defect occurs when recording data to a particular sector, data is recorded continuously to the recording medium by saving the data to a reserved recording sector area, which is reserved separately from the normal data recording sectors, no matter what the cause of the recording defect. This operation of recording to a reserved sector area data that should be recorded to the sector in which a recording defect occurred is called "alternative recording," and the reserved sector area used for alternative recording is called an "alternative area."

In consideration for the above-noted problems, an object of the present invention is therefore to provide a defect management method whereby the size of the required alternative area can be suppressed and a disc-shaped recording medium can be efficiently used, and to provide a recording and reproducing apparatus for a disc-shaped recording medium.

DISCLOSURE OF THE INVENTION

A disc-shaped recording medium recording and reproducing apparatus for recording data by sector unit to a disc-shaped recording medium having a structure with a plurality of recording sectors, said disc-shaped recording medium recording and reproducing apparatus characterized by comprising: a coding means for error detection and correction coding said data twice, in row and column directions, and segmenting said data into sector units; a means for recording data coded in sector units to a sector in a first recording area of said disc-shaped recording medium; a defective sector discrimination means for reproducing said sector to discriminate whether the sector is a defective sector; and a defective sector substitution means for, when said sector is determined to be a defective sector, recording data recorded to a defective sector to an alternative sector in a second recording area disposed on said disc-shaped recording medium.

BEST MODE FOR ACHIEVING THE INVENTION

A defect substitution method and a recording and reproducing apparatus based on a working example of the present invention are described below with reference to the accompanying figures using an optical disc recording medium as exemplary of a disc-shaped recording medium, including magnetic recording media.

Figure 1:
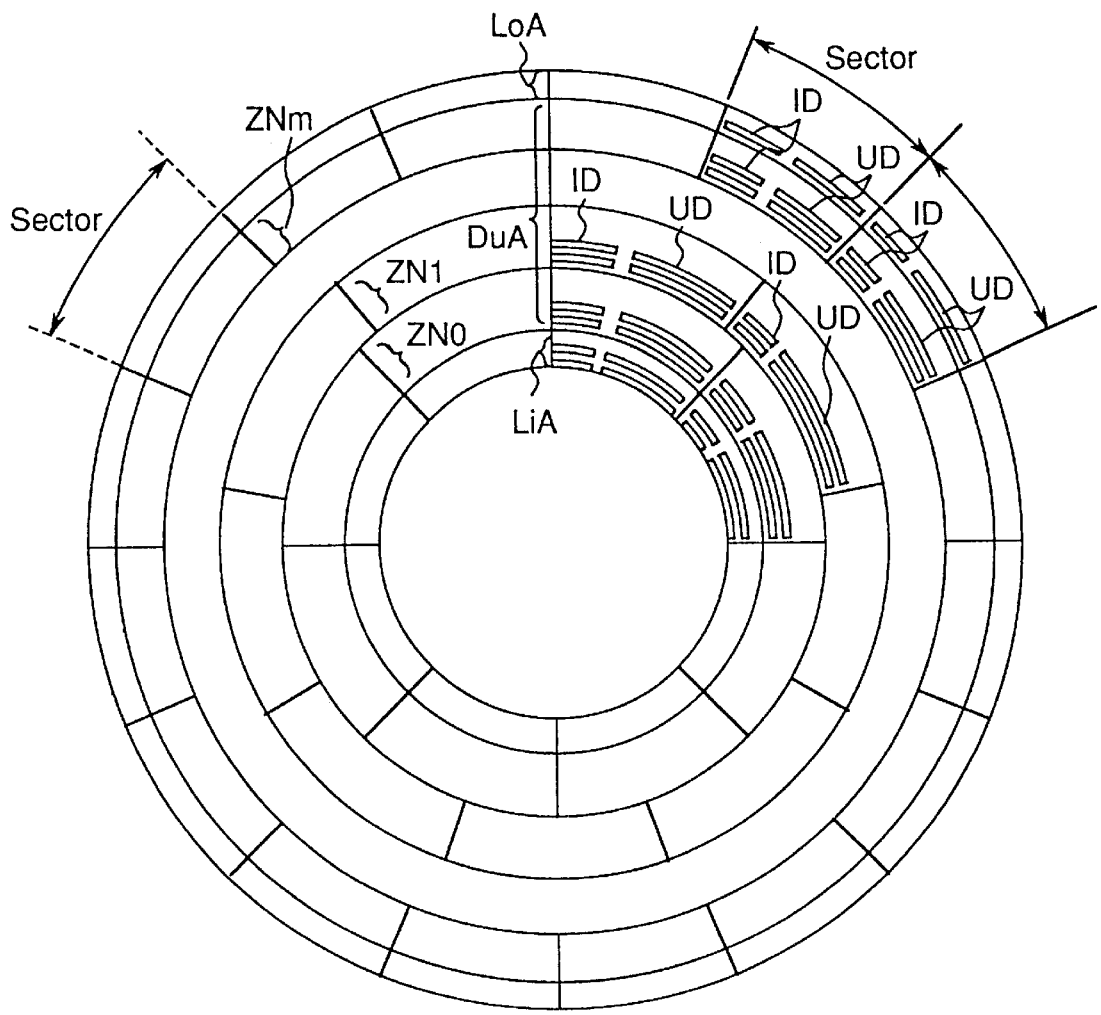
FIG. 1 is a view of the recording surface of an optical disc recording medium according to an embodiment of the present invention.

The physical format of a recording surface of an optical disc recording medium written by a recording and reproducing apparatus according to the present invention is shown in FIG. 1. This optical disc recording medium (hereafter simply "optical disc") is segmented, in sequence from the inside circumference side of the disc, into a lead-in area LiA, a data area DuA, and a lead-out area LoA. Management information for data recorded to the optical disc, and including information for defect management, is recorded to the lead-in area LiA and lead-out area LoA. User data is recorded to the data area DuA. Each track, which corresponds in this example to one revolution of the disc, is divided into plural sectors. Each sector comprises an ID part containing a preformatted sector address, and a data recording part UD to which data is written. The sector address written to the ID part is lowest in the sectors at the inside circumference and increases sequentially at each sector.

The data area DuA in the present example is formatted for zone-constant linear velocity (ZCLV) access, that is, the data area DuA is segmented into a plurality of zones ZN0 to ZNm (where m is an integer), the number of sectors per track in a given zone ZN increases from the inside circumference to the outside circumference of the disc, and the rotational velocity of the disc is adjusted for each zone to achieve a constant transfer rate. In the present example, there are 8 sectors per track in zone ZN0 and the lead-in area LiA, 9 sectors per track in zone ZN1, and 16 sectors per track in zone ZNm and the lead-out area LoA.

Figure 2:
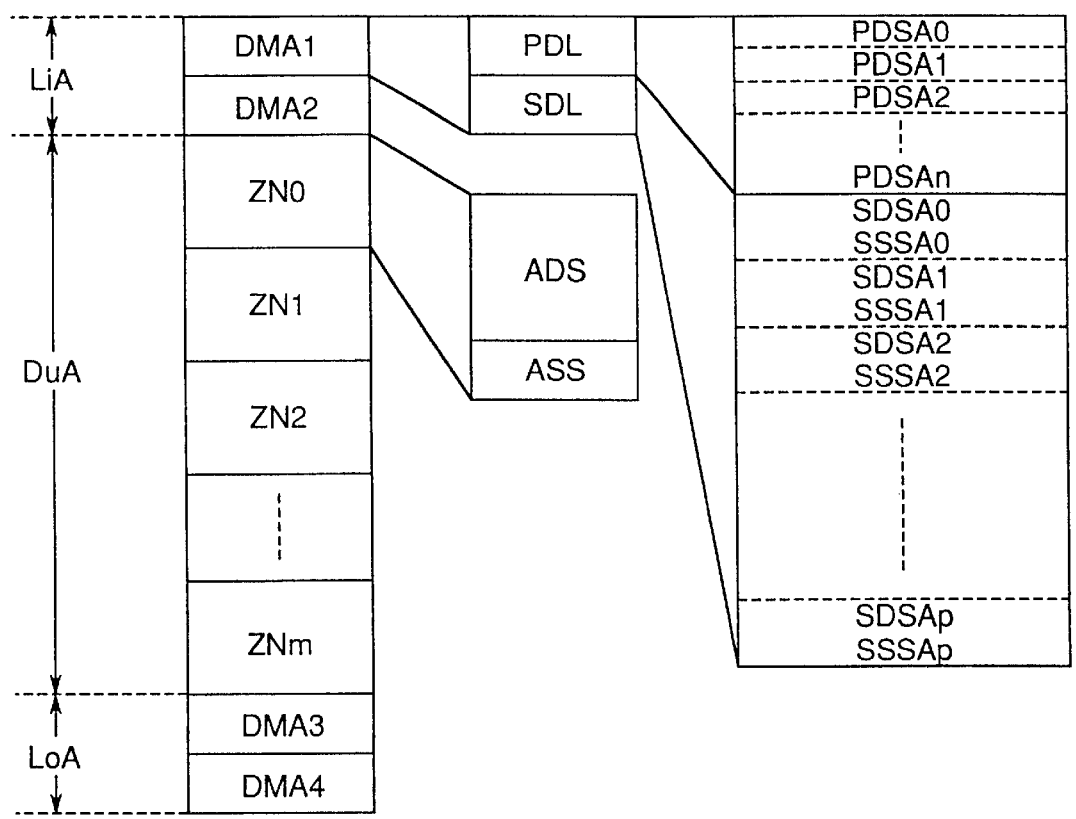
FIG. 2 is a view of the logic structure of a recording area of the optical disc recording medium shown in FIG. 1.

The logical format of a recording surface of the optical disc shown in FIG. 1 is shown in FIG. 2. The leading area LiA is segmented into two areas, defect management areas DMA1 and DMA2, to which management information for defect management is recorded. The data area DuA is segmented into a plurality of zones ZN0 to ZNm. Each zone ZN is divided into a data sector area ADS to which user data is written, and a spare sector area ASS, which is used as an alternative sector when a defective sector is found.

The lead-out area LoA is segmented into two areas, defect management areas DMA3 and DMA4, to which management information for defect management is recorded. For increased reliability, the same information is recorded to a primary defect list PDL and a secondary defect list SDL in each of the defect management areas DMA1, DMA2, DMA3, and DMA4. The primary defect list PDL contains defective sector addresses PDSA0 to PDSAn (where n is an integer) in sequence from low to high address where the defective sector addresses PDSA0 to PDSAn are defect management information used for a slipping method described below. The secondary defect list SDL contains defective sector addresses SDSA0 to SDSAp (where p is an integer) and alternative sector addresses SSSA0 to SSSAp in sequence from low to high address where defective sector addresses SDSA0 to SDSAP are defect management information used for a linear placement method described below.

An effective method of handling burst-mode read/write errors in an optical disc thus formatted is to increase the interleave length in depth of the error detection and correction code, disperse burst-mode errors to the level of random errors with respect to the error detection and correction code, and thereby improve data reproduction reliability. For example, in an optical disc recording medium provided for recording and reproducing digitally compressed image data, 2 KB of user data is recordable per sector, and the error detection and correction code is compiled for blocks of 16 sectors, thereby more deeply interleaving error detection and correction. More specifically, the data is formatted so as to increase the interleave length in depth by error detection and correction coding each 32 KB block of user data twice, that is, in row and column directions, creating coded data blocks each containing a total of about 38 KB of data, including error detection and correction coding parity data.

While a read-only optical disc recording medium (hereafter a "ROM disc") containing prerecorded data can only be read, user data can be recorded using a recording device (hereafter "drive") to an optical disc recording medium that can both be read from and written to (hereafter a "RAM disc"). For the reasons described above, however, it is not always possible to completely record the data to be recorded. That is, it is generally difficult to ensure normal recording of data to all sectors because of defects in the recording medium occurring during or after manufacture, deflection of the medium, variations in the positioning precision inside the drive, or dust and other foreign matter.

The drive therefore generally has a defect substitution function for applying a read verification process whereby the recorded data is reproduced to confirm that normal reproduction is possible, and substituting an alternate recording area when a writing error is detected. Writing error detection is typically performed during the process of decoding the error detection and correction code during reproduction, and the unit used for this substitution process is therefore the error detection and correction coding unit. With a magneto-optical disc used for recording code data, for example, the defect substitution process is applied in 512 byte blocks, the unit used for error detection and correction coding, or in units of a single sector, which corresponds to 1 KB of user data.

When the error detection and correction code is the unit for the defect substitution process, a write error in one place requires the entire corresponding error detection and correction code to be alternately recorded, and when an error correction code with a deep interleave is used, it is necessary to reserve more alternate recording areas. As a result, the ability to effectively utilize the recording area of the recording medium can be impaired. For example, when a block of 16 sectors is the unit for one error detection and correction code in a RAM disc as described above, all 16 sectors must be substituted when a write error occurs in any one sector, and in a worst-case scenario a 16-sector alternative area is required for each defective sector. The present invention therefore further provides an error detection and correction coding method and apparatus for minimizing the alternative area required for a single writing error, and improving the utilization efficiency of the recording medium, as described in detail below with reference to FIG. 3 to FIG. 15.

Figure 3:
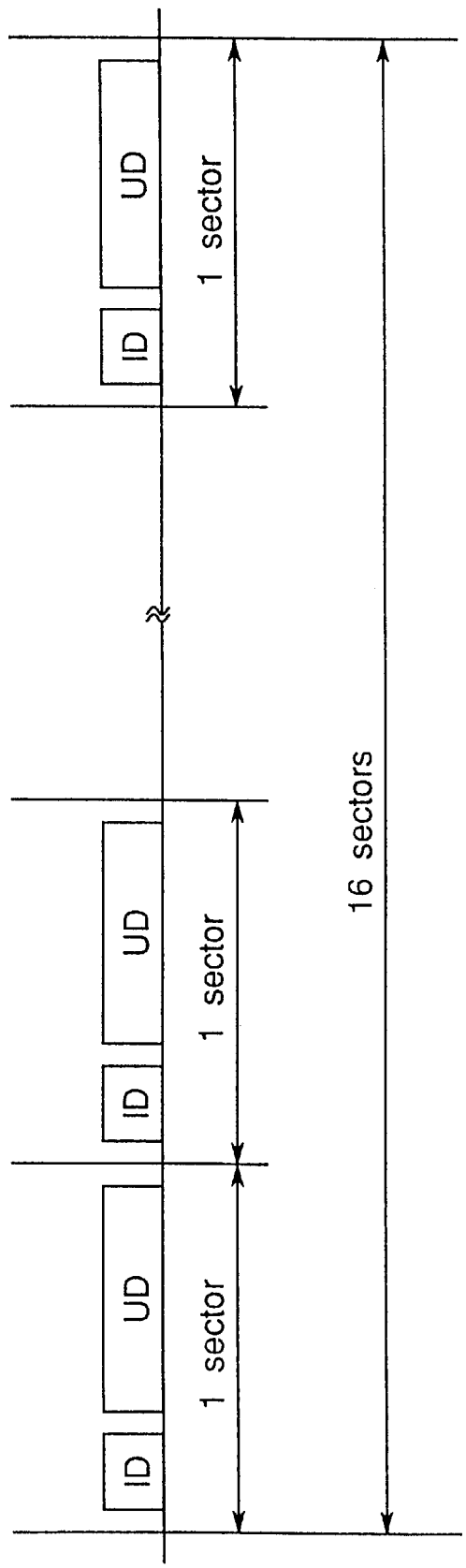
FIG. 3 is an illustration showing the relationship between a sector and error detection and correction coded data according to an embodiment of the present invention.

FIG. 3 shows the relationship between a sector and the error detection and correction coding data according to the present invention. The coded data for one error detection and correction code is allocated and recorded to the data recording areas UD in 16 sectors. As described above, address information is prerecorded to the ID part, and user data is recorded to the data recording area UD.

Figure 4:
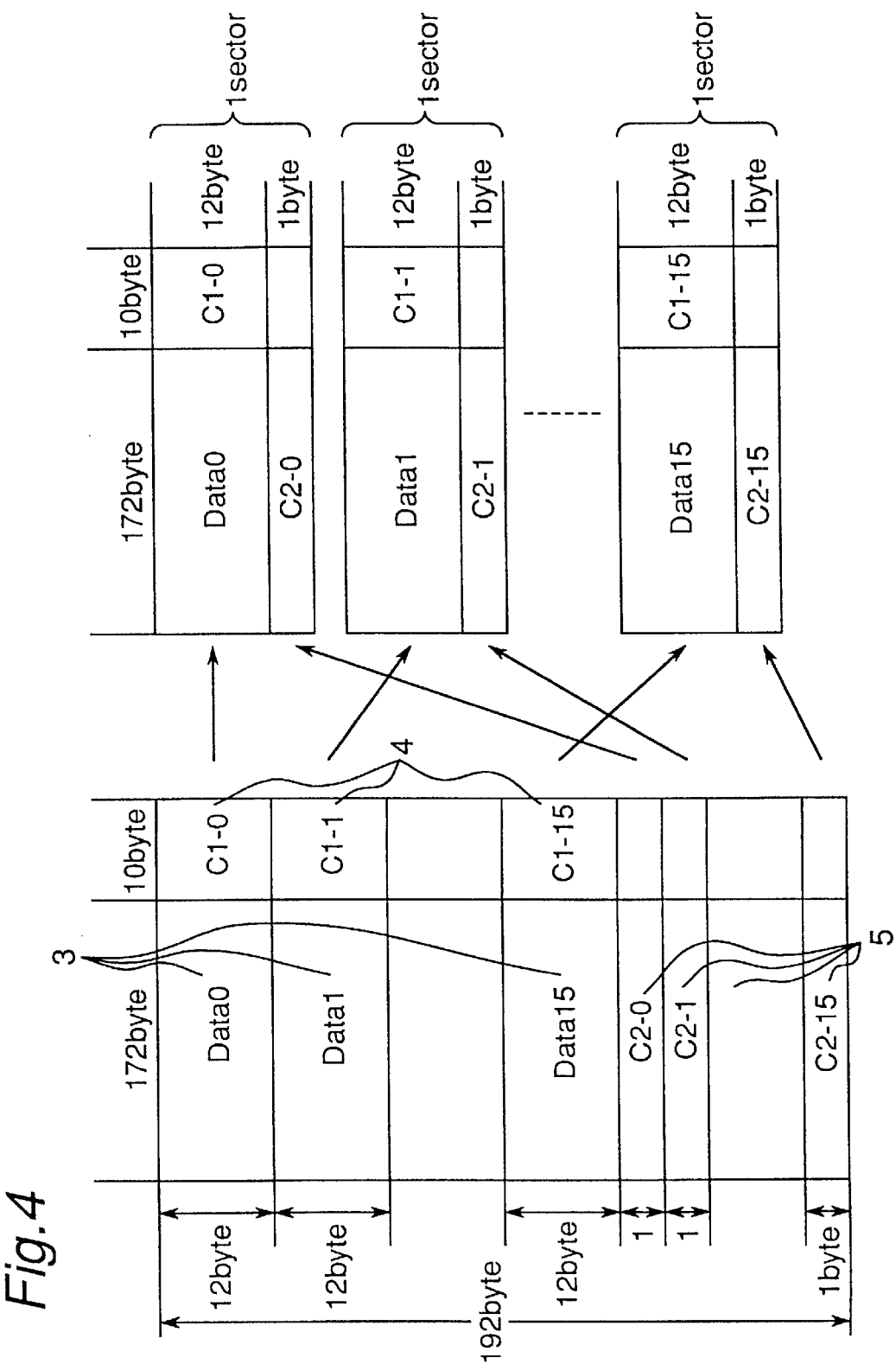
FIG. 4 is a view showing an interleaving method for error detection and correction coded data according to an embodiment of the present invention.

An interleaving method for an error detection and correction code according to the present invention is shown in FIG. 4. The structure of the error detection and correction code is shown on the left side of FIG. 4, and the method of interleaving the error detection and correction code for recording to 16 sectors as shown in FIG. 3 is shown on the right side of the figure.

As shown in the figure, the error correction code shown on the left side comprises approximately 32 KB of data 3, which contains Data 0 to Data 15, each approximately 2 KB, including 2 KB of user data, a CRC for error detection, and control data for such as copyright protection, and is arranged in a row and column pattern containing 172 bytes per row and 192 bytes per column. Reference numeral 4 denotes a C1 parity which contains parity blocks C1-0 to C1-15, which are generated by error detection and correction coding data 3 in rows, and adding a 10-byte parity code to each row. Reference numeral 5 denotes a C2 parity which contains parity blocks C2-0 to C2-15, which are generated by error detection and correction coding data 3 in columns, and adding a 16-byte parity code for each column.

Thus, as described above, a product code is used for error detection and correction coding approximately 32 KB of data in both row and column directions. In addition, both the row and column error detection and correction codes are formatted for high reliability error correction using a Reed-Solomon code to ensure a sufficiently long interleave length of approximately 38 KB, including parity data, and effective correction of both random errors and burst errors.

In the structure of the interleaved error detection and correction code shown on the right, data 3 is segmented row-wise into 16 blocks from Data 0 to Data 15. The C1 parity 4 is divided row-wise into 16 blocks from C1-0 to C1-15. The C2 parity 5 is segmented row-wise into 16 blocks from C2-0 to C2-15. The data recorded to each sector comprises one block of segmented data 3, one block of C1 parity 4, and one block of C2 parity 5. The recording data of one sector is then recorded to the data recording area UD of 16 sectors in m row direction.

In other words, row 1 of Data 0, row 1 of C1-0, row 2 of Data 0, row 2 of C1-0, and so on to row 12 of Data 0, row 12 of C1-0, and C2-0 are recorded to the first sector. Row 1 of Data 1, row 1 of C1-1, row 2 of Data 1, row 2 of C1-1, and so on to row 12 of Data 1, row 12 of C1-1 and C2-1 are recorded to the second sector. Subsequent sectors are similarly recorded until the 16th sector where row 1 of Data 15, row 1 of C1-15, row 2 of Data 15, row 2 of C1-15, and so on to row 12 of Data 15, row 12 of C1-15, and C2-15 are recorded.

As thus described above, 32 KB of user data is product coded, and recorded distributed across 16 sectors.

Figure 5:
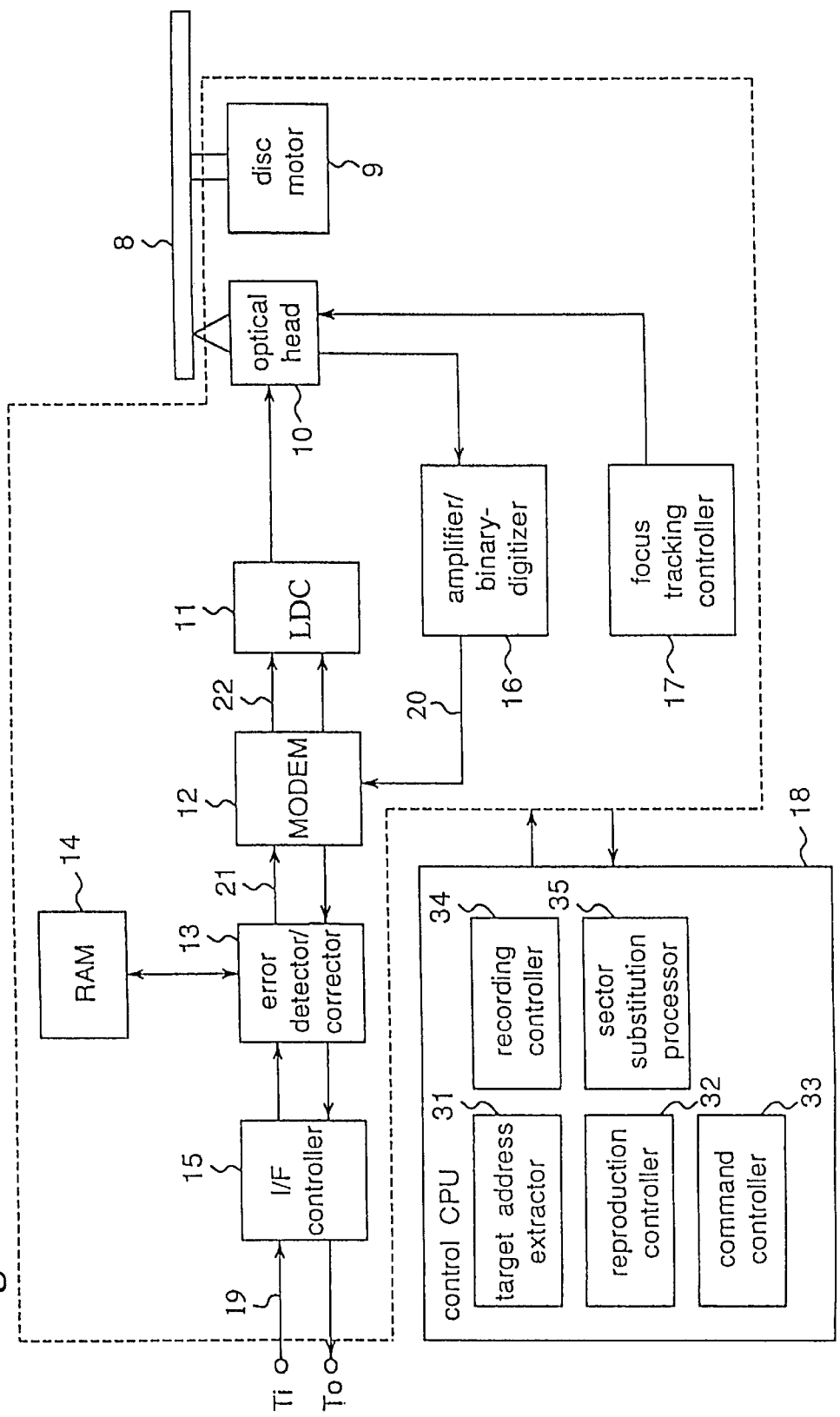
FIG. 5 is a block diagram showing the configuration of an optical disc recording medium recording and reproducing apparatus according to an embodiment of the present invention.

The configuration of a recording and reproducing apparatus according to the present invention for use with a disc-shaped recording medium and with application to an optical disc is shown in FIG. 5. The apparatus comprises an optical disc 8, disc motor 9, optical head 10, laser drive circuit 11, modulator/demodulator 12, error detector and corrector 13, RAM 14, interface controller 15, amplifier/digitizer 16, focus tracking controller 17, and control CPU 18. The disc motor 9 rotates the optical disc 8. The optical head 10 comprises an optical lens and semiconductor laser, and accomplishes reading data from and writing data to the optical disc 8. The laser drive circuit 11 drives the laser of the optical head 10. During recording, the modulator/demodulator 12 digitally modulates the data to a form suitable for recording, and during reproduction demodulates the data. The error detector and corrector 13 error detection and correction codes the data during recording, and during reproduction decodes the coded data and applies error detection and correction. RAM 14 is used as a data buffer and working RAM of the error detector and corrector 13. The interface controller 15 controls interfacing with a host computer through an external input terminal Ti and output terminal To. The amplifier/digitizer 16 amplifies and digitizes the reproduced signal. The focus tracking controller 17 tracks the optical head 10 to the target track, and focuses the laser beams on the recording surface.

The control CPU 18 is the control device providing overall control of the optical disc recording and reproducing apparatus, and comprises a target address extractor 31, reproduction controller 32, command controller 33 for such operations as command analysis, a recording controller 34, and a sector substitution processor 35.

The target address extractor 31 determines the sector address for reading or writing. The reproduction controller 32 reproduces data from a sector. The command controller 33 for such operations as command analysis performs such operations as analyzing commands from a host computer. The recording controller 34 controls recording for writing data to a sector. The sector substitution processor 35 handles alternate recording in sector units when a defective sector is found during recording. The control CPU 18 is preferably a microprocessor whereby the functions of the component units thereof can be accomplished in software.

The data recording operation by an optical disc recording and reproducing apparatus thus constructed is described briefly below.

User data S19 sent from a host computer is passed by the interface controller 15 and temporarily stored to the RAM 14, which is a working buffer for the error detector and corrector 13. Note that user data S19 corresponds to Data 0 to Data 15 described above with reference to FIG. 4. The error detector and corrector 13 generates the C1 parity 4 and C2 parity 5 by means of row-wise coding, that is, C1 coding, and column-wise coding, that is C2 coding. The control CPU 18 notifies the focus tracking controller 17 of the target track, and the focus tracking controller 17 thus moves the optical head 10 to the target track. The light beam emitted from the optical head 10 is reflected by the optical disc 8, producing a read beam that is supplied to the amplifier/digitizer 16.

The read beam is modulated according to the pits and lands of the ID part to which the prerecorded address information is recorded. In the data recording area UD where data is recorded, the read beam is modulated according to the variations in amount of reflected light produced by the recording marks. The modulated read beam is thus converted by the amplifier/digitizer 16 to digital read signal S20, which is supplied to the modulator/demodulator 12. The modulator/demodulator 12 detects the address of the target sector from the digital read signal S20, and digitally modulates the coded data S21 from the error detector and corrector 13. The digitally modulated modulation data S22 is sent to the laser drive circuit 11, which modulates the laser power according to the modulation data S22, and records data to the data recording area UD of the target sector on the optical disc 8. While the data of 16 sectors is the smallest unit used for error detection and correction coding, data can be recorded in sector units because each sector has a unique address.

The operation for reproducing data is described briefly next. When data is reproduced, the control CPU 18 sends the target track for data reproduction to the focus tracking controller 17, and the focus tracking controller 17 tracks the light beam from the optical head 10 to the target track. As during recording, a digital read signal 20 is generated from the light reflected from the optical disc 8, and the target sector is detected by the modulator/demodulator 12. The modulator/demodulator 12 digitally demodulates the digital read signal 20 obtained from the data recording area of the target sector, and supplies the result as the reproduced data to the error detector and corrector 13. The error detector and corrector 13 begins the error detection and correction operation after 16 sectors of reproduction data have been supplied from the modulator/demodulator 12. That is, decoding the C1 and C2 error correction codes is repeated to the correction capacity of the code, thereby correcting read errors resulting from foreign matter on the recording surface of the optical disc 8. The corrected data is then passed through the interface controller 15 to the host computer.

The above operations are controlled by the control CPU 18 and executed as a single continuous operation. It should be noted that description of a timing control circuit and other components common to a conventional recording and reproducing apparatus for an optical disc recording medium is omitted in FIG. 5 and the above description.

Figure 6:
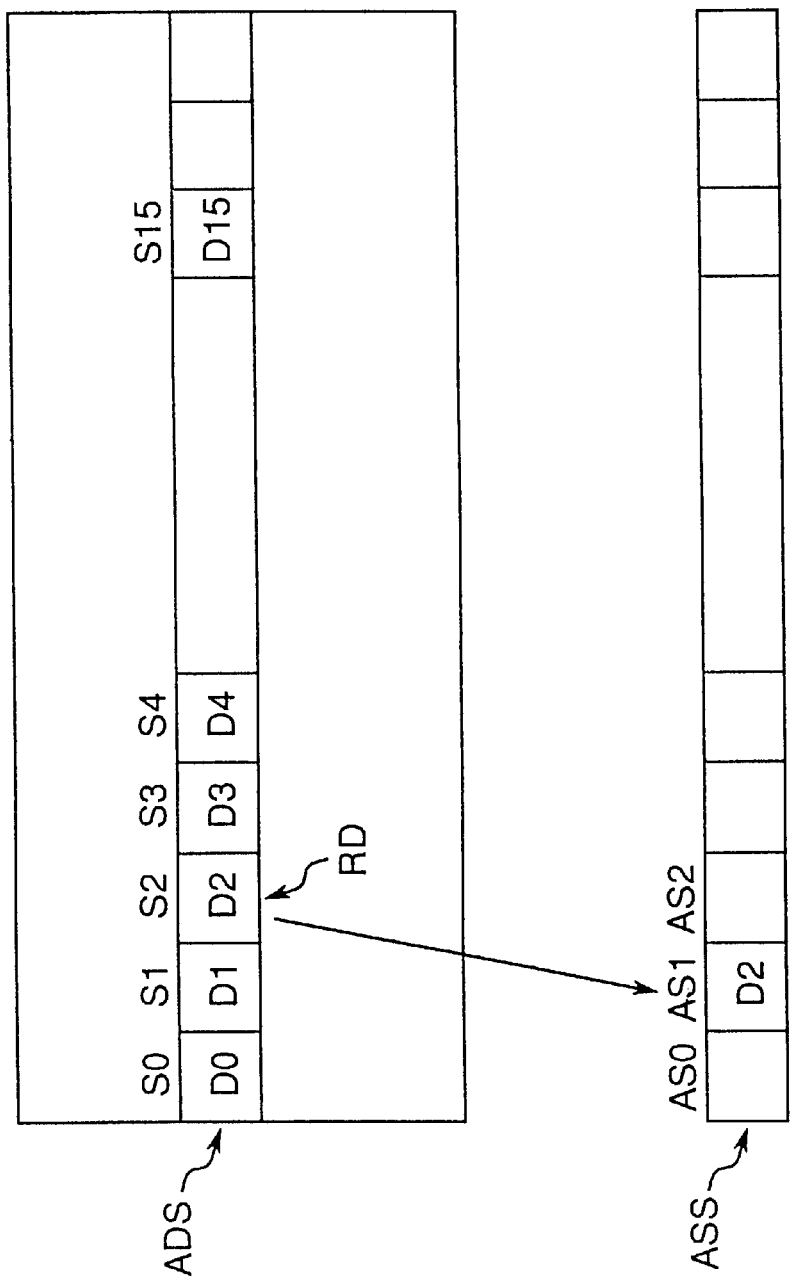
FIG. 6 is a view used to describe the defective sector substitution process according to a first embodiment of the present invention.

FIG. 6 is an illustration of a substitution process according tdo the present invention adapted to a linear replacement type sector substitution process. As described with reference to FIG. 2, data is recorded to a data sector area ADS provided in each zone ZN in the linear replacement method, and the data intended for recording to a defective sector is recorded to a spare sector area ASS.

What occurs when a single unit of error detection and correction coded data is recorded to 16 sectors from sector S0 to S15 is considered below. Whether recording was accomplished normally or not is determined by detecting address reproduction errors during recording, or by a verification process, that is, by reproducing data after it is recorded to determine whether the data can be normally reproduced. It is assumed below that a recording error was detected by this verification process in sector S2, that is, that sector S2 is a defective sector.

In this case, sector substitution is not applied to all 16 sectors, that is, the entire error detection and correction coding unit. Instead, only the data D2 that should be recorded to the defective sector S2 is recorded to an alternate sector, for example alternate sector AS1, in the spare sector area ASS. In the subsequent recording and reproducing, the alternate AS1 is always used instead of the defective sector S2. This method whereby alternate data is recorded continuously is known as the linear replacement method.

Therefore, in the present working example of the invention described above, alternate sector recording is applied by sector unit rather than an masse to the 16 sector unit used for error correction coding. It is therefore only necessary to provide one alternate sector for one defective sector even when a defective sector is generated, thereby reducing the number of sectors that must be provided as alternate sectors, and enabling an optical disc to be efficiently utilized.

A substitution method based on a verification process whereby recorded data is immediately reproduced to determine whether data is correctly recorded, and a linear replacement operation implemented as described in the present working example after the verification process, is described next.

Data is recorded as described above. The recorded data is stored in RAM 14 until the verification process described below is completed. Data reproduction in the verification process differs from the normal reproduction operation and in the operation of the error detector and corrector 13. In the case of reproduction for the verification process, the error detector and corrector 13 only decodes data from a particular sector, and therefore only decodes the C1 code, when decoding the read data supplied from the modulator/demodulator 12. The C1 code is a Reed-Solomon code with an additional 10-byte parity code, enabling correction of a maximum 5 bytes at any particular position in the code word. In the present example, however, the correction operation is limited to 3 bytes, and detection of any error exceeding this level results in a recording error determination. A specific sector can be identified when an error exceeding 3 bytes is detected because the C1 code is coded row-wise. Both sectors containing a single error exceeding 3 bytes are identified as recording error sectors, and sectors in which an error occurs in the ID part and in which the address information cannot be detected during recording, are treated as defective sectors, which are handled by the sector substitution process described below.

In the sector substitution process, the control CPU 18 determines the address of an unused alternate sector in the spare sector area ASS when detection of a recording defect sector is reported by the error detector and corrector 13. The target track is then extracted from said determined alternate sector address, the focus tracking controller 17 is informed of the target track as during the recording operation described above, and the data is then recorded. Only the data from the defective sector is recorded when recording to an alternate sector, and recording is thus controlled by sector unit. A map of information describing the relationship between defective sectors and alternate sectors is also recorded at this time to a separate substitution management sector.

By thus applying the sector substitution process to sector units as described above, alternate sectors are not needed for the plurality of sectors used as the unit for the error correction code when a single sector is determined to be defective, and it is only necessary to provide one alternate sector for one defective sector. As a result, the number of sectors that must be reserved as alternate sectors can be reduced, and the optical disc can be efficiently utilized as described above.

Figure 7:
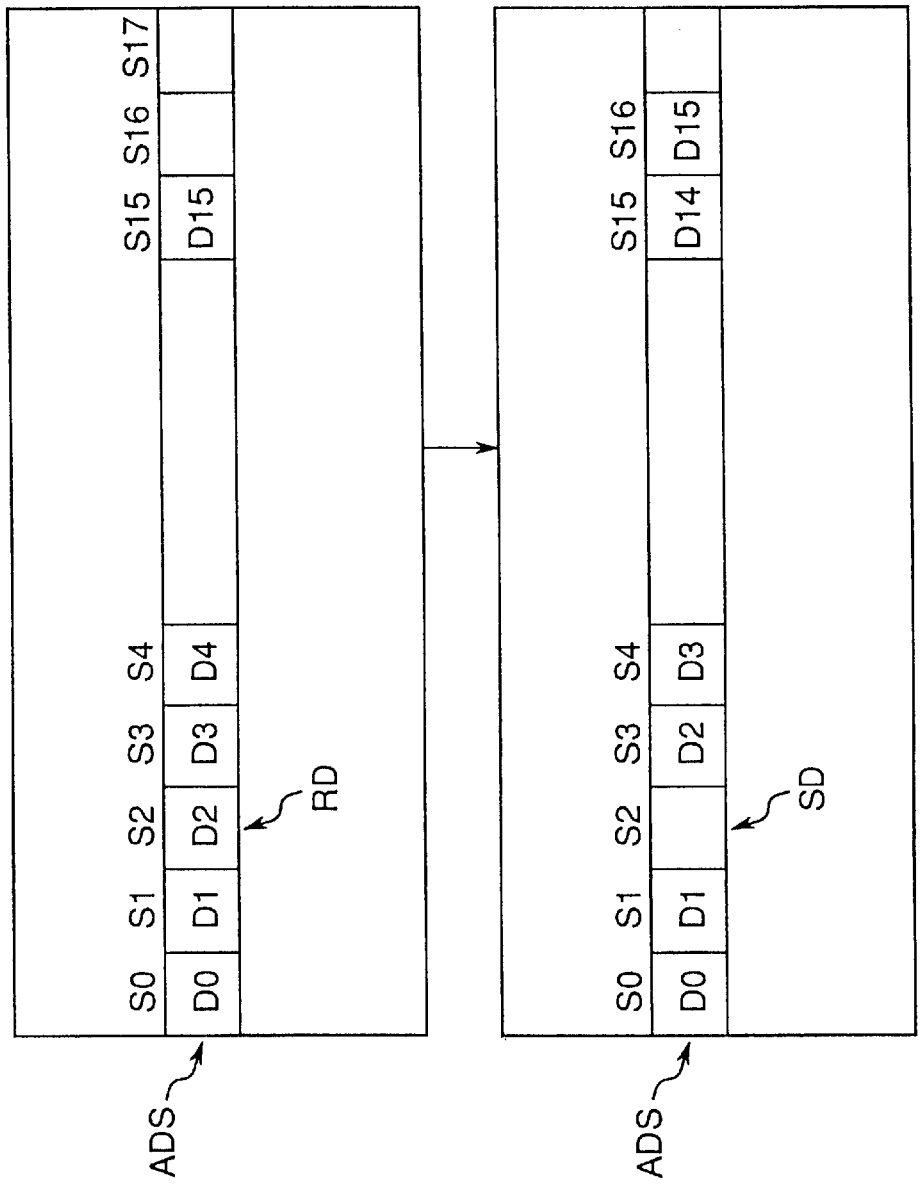
FIG. 7 is a view used to describe the defective sector substitution process according to a second embodiment of the present invention.

FIG. 7 is an illustration of a substitution process according to the present invention adapted to a slipping sector substitution process. Data is also recorded to a data sector area ADS provided in each zone ZN in the slipping method, but the data intended for recording to a defective sector is recorded to the data sector area ADS after the defective sector. That is, the data sector area ADS is handled in the slipping method as a combination of the above-described data sector area (ADS) and the spare sector area (ASS) of the linear replacement method.

Note that the data verification process is the same in the slipping method as in the linear replacement method, and the sector substitution process is therefore described briefly below.

What occurs when a single unit of error detection and correction coded data is recorded to 16 sectors from sector S0 to S15 is considered below. Whether recording was accomplished normally or not is determined by detecting address reproduction errors during recording, or by a verification process, that is, by reproducing data after it is recorded to determine whether the data can be normally reproduced. It is assumed below that a recording error was detected by this verification process in sector S2, that is, that sector S2 is a defective sector. Instead of shifting the recording sectors 16 sectors, the unit used for error detection and correction coding, in this case, the data D2 that should have been recorded to the defective sector S2 is recorded to sector S3, the data D3 that should have been recorded to sector S3 is recorded to sector S4, and so on, shifting each sector after the defective sector one sector from the intended recording sector. The detected defective sector S2 is thereafter skipped by this slipping sector substitution process during subsequent data recording and reproducing operations. As thus described, however, sector skipping is managed in single sector units and not in units of sixteen sectors corresponding to the 16 sector unit of the error correction code. It is therefore only necessary to provide one alternate sector for one defective sector, thereby reducing the number of sectors that must be provided as alternate sectors, an enabling an optical disc to be efficiently utilized. It should be noted that if there are not enough data sectors in the data sector area ADS as a result of alternate sector slipping, data can be recorded to the spare sector area ASS of the linear replacement method.

An advantage of the slipping method is that performance is not degraded by substitution for a defective sector as a result of a seek operation such as required in the linear placement method, that is, movement of the optical head 10 to the spare sector area ASS of the data sector area ADS during data recording and reproduction. However, the slipping method is constrained by the need for the following sector to be unused. It is therefore preferable for the slipping method and the linear replacement method to be combined during use, that is, for the slipping method to be used for sector substitution when recording the disc for the first time after initialization, and for the linear replacement method to be used for sector substitution during subsequent recording operations.

It should be noted that error correction is applied only to the C1 code to identify recording error sectors in the above-described linear replacement method and slipping method. However, when a CRC or other error correction code for the sector data 3 is inserted to the sector data 3, the CRC can be decoded using only data from a particular sector. It is therefore possible to use the CRC for error detection after correcting the C1 code, and to detect recording error sectors based on this detection result.

As will be known from the above description, the sector substitution process is applied on a single sector basis for an error detection and correction coding unit of 16 sectors in both linear replacement and slipping methods in the present invention, thereby consuming fewer alternate sectors when a defective sector is detected, and enabling a disc to be efficiently utilized.

The operation of an optical disc recording and reproducing apparatus based on the present invention as shown in FIG. 5 is described next with reference to FIG. 8. Note that this process starts with a user instructing a host computer to write data to the optical disc 8 using a keyboard or other input means.

Then, at step #100, the command received from the host computer through the input terminal Ti is analyzed by the control CPU 18 to determine whether the requested process is a write (record) or read (reproduce) operation. If a write command is received, control advances to step #200; if a read command is received, control advances to step #800.

At step #200, the interface controller 15 is controlled for receiving the data to be recorded from the host computer. After the recording data S19 is received, the procedure steps to step #300.

The target address, that is, the address of the sector to which the data is to be recorded, is obtained from the primary defect list PDL and the secondary defect list SDL in step #300, and the procedure steps to step #400. Note that this step is described in further detail below with reference to FIG. 11. Briefly, however, the defective sector addresses PDSA0 to PDSAn contained in the primary defect list PDL, and the defective sector addresses SDSA0 to SDSAp and alternative sector addresses SSSA0 to SSSAp contained in the secondary defect list SDL as described with reference to FIG. 2, are detected.

At step #400, data is recorded to the sector at the target address detected in step #300, and the procedure steps to step #500. Note that the data recorded in this step #400 is stored in RAM 14 until all processes in steps #500, #600, and #700 are completed. Note that this step is described in further detail below with reference to FIG. 10.

After confirming whether the recorded sector can be correctly reproduced, that is, after the verification process of the recorded data, in step #500, the procedure steps to step #600. Note that data reproduction control of the error detector and corrector in this verification process step differs from that during normal data reproduction. That is, when the error detector and corrector 13 decodes the reproduced data from the modulator/demodulator 12, it decodes only data from the same sector, and thus decodes only the C1 code.

As a result of the verification process in step #500, it is determined in step #600 whether data was normally recorded to the intended target sector. The C1 code is a Reed-Solomon code with an additional 10-byte parity code, enabling correction of a maximum 5 bytes at any particular position in the code word. In the present step, however, the correction operation is limited to 3 bytes, and detection of any error exceeding this level results in a recording error determination. That is, a sector containing a single error exceeding 3 bytes is identified as a recording error sector, and a sector in which an error occurs in the ID part and in which the address information cannot be detected during recording, are treated as defective sectors. If the verification process returns yes because data recorded to the target sector cannot be normally reproduced, that is, the target sector is determined to be a defective sector, the procedure steps to step #700.

At step #700, a sector substitution process using either a slipping method or linear replacement method is performed, and the procedure then terminates. Note that operation in the slipping method and linear replacement method is described in further detail below with reference to FIG. 14 and FIG. 15.

If step #600 returns no, that is, the target sector is not a defective sector, the procedure ends.

If the received command is determined in the first step #100 to be a read command, the address of the sector from which data is to be read is detected in step #800 in the same manner as in step #300, and the procedure steps to step #1000. More specifically, the addresses of the sectors to be accessed in the reproduction sequence are detected based on the defective sector addresses PDSA0 to PDSAn contained in the primary defect list PDL, and the defective sector addresses SDSA0 to SDSAp and alternative sector addresses SSSA0 to SSSAp contained in the secondary defect list SDL.

At step #1000, data is reproduced from the sectors at the target addresses detected in step #800, and the procedure steps to step #1100. The operation of this step is described in detail below with reference to FIG. 9.

At step #1100, the interface controller 15 is controlled to transfer the reproduced data to the host computer, and the procedure then ends.

Figure 8:
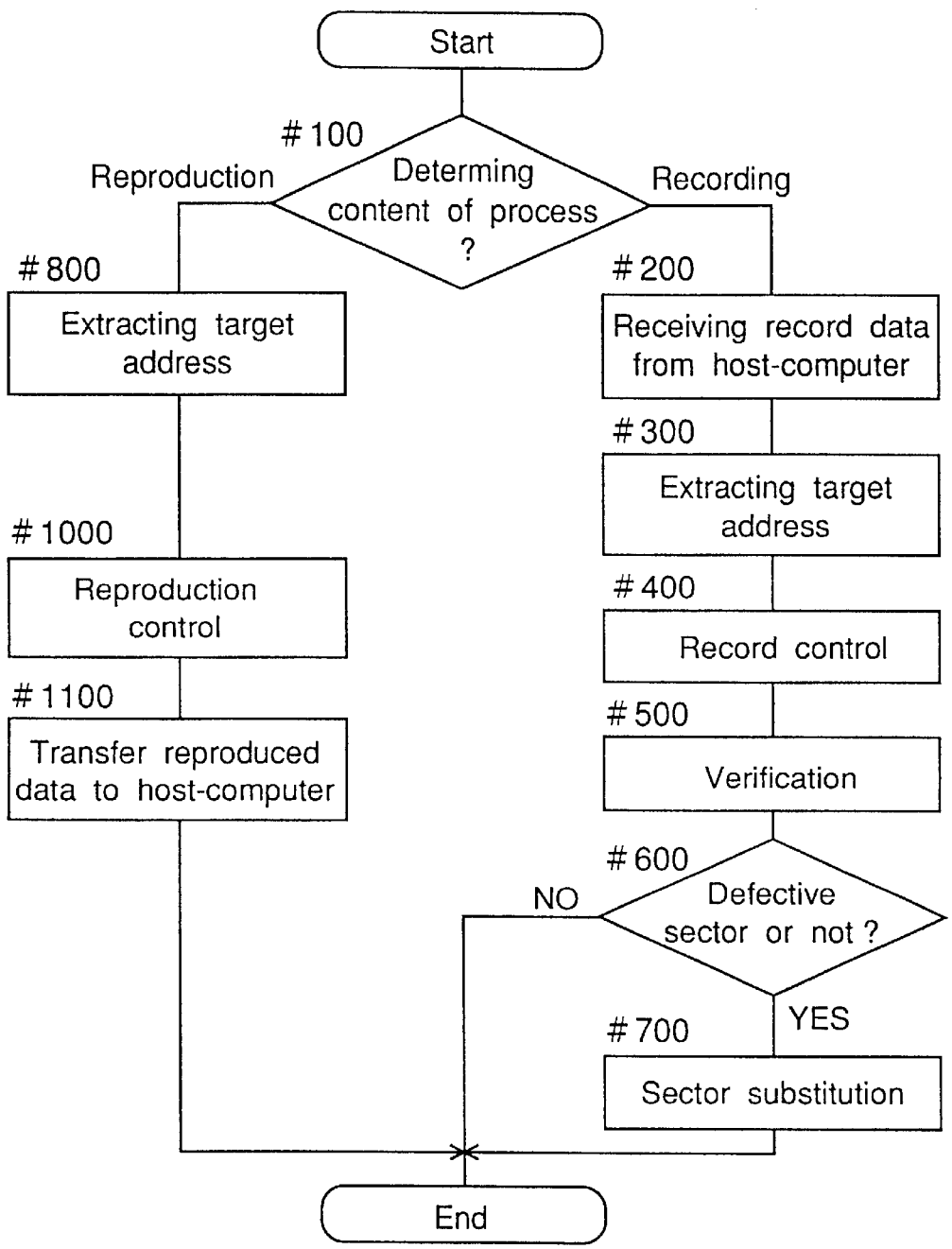
FIG. 8 is a flow chart showing the operation of the optical disc recording medium recording and reproducing apparatus shown in FIG. 5.
Figure 9:
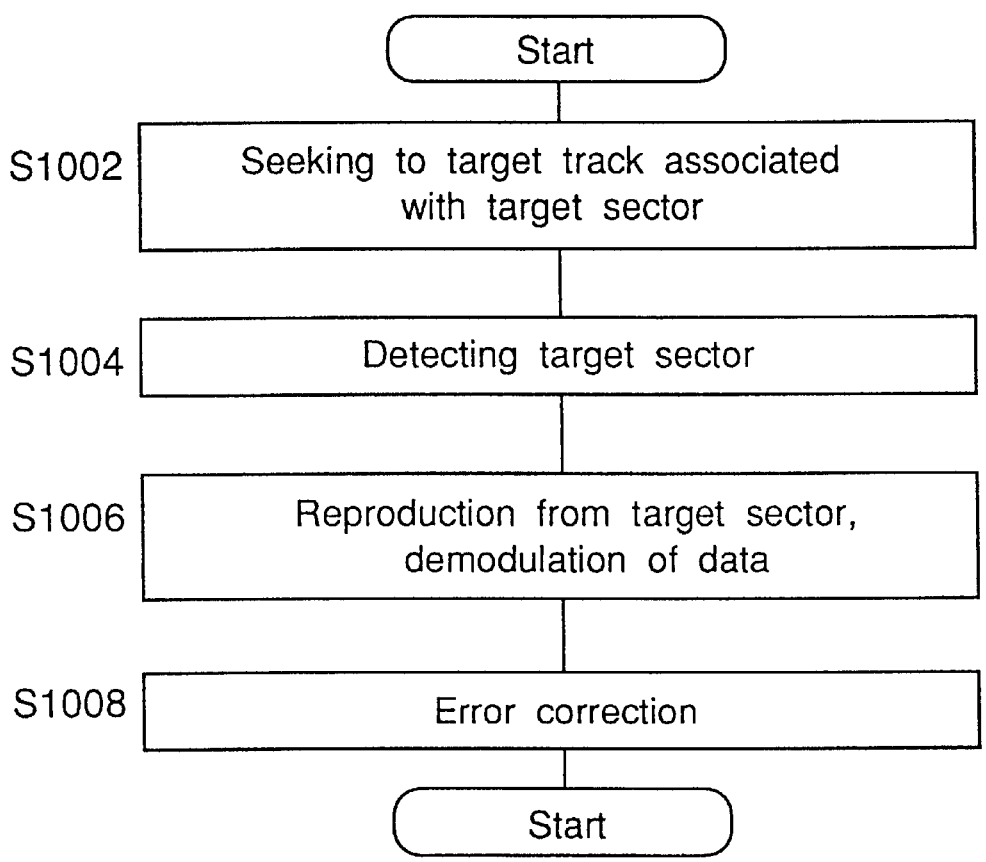
FIG. 9 is a flow chart showing the detailed operation of the reproduction control step shown in FIG. 8.

Operation of the control CPU 18 in the reproduction control step #1000 in FIG. 8 is described next with reference to FIG. 9.

At step S1002, the control CPU 18 controls the focus tracking controller 17 in a seek operation for moving the optical head 10 to the target track associated with the target sector to be read, and the procedure steps to step S1004. In this seek operation, focus tracking controller 17 is controlled to move the optical head 10 to the target track associated with the target sector to be read, and track the light beam to the target track.

At step S1004, the address recorded to the ID part of the sector is reproduced by the modulator/demodulator 12. The target sector is detected by a match between the reproduced address and the address of the target sector, and the process then steps to step S1006. More specifically, the target sector is detected by means of the modulator/demodulator 12 comparing and matching the address of the target sector with the address reproduced from the ID part of the disc.

At step S1006, data is reproduced from the data recording area UD of the detected target sector, digitally demodulated, and the procedure then steps to step S1008. The digitally demodulated reproduction data from the modulator/demodulator 12 is sent to the error detector and corrector 13.

At step S1008, the control CPU 18 controls the error detector and corrector 13 to correct errors resulting from dust, foreign matter, and defects on the optical disc 8, and the process then ends. That is, the error detection and correction code is decoded, error correction is applied, and the corrected data is stored to the RAM 14.

Figure 10:
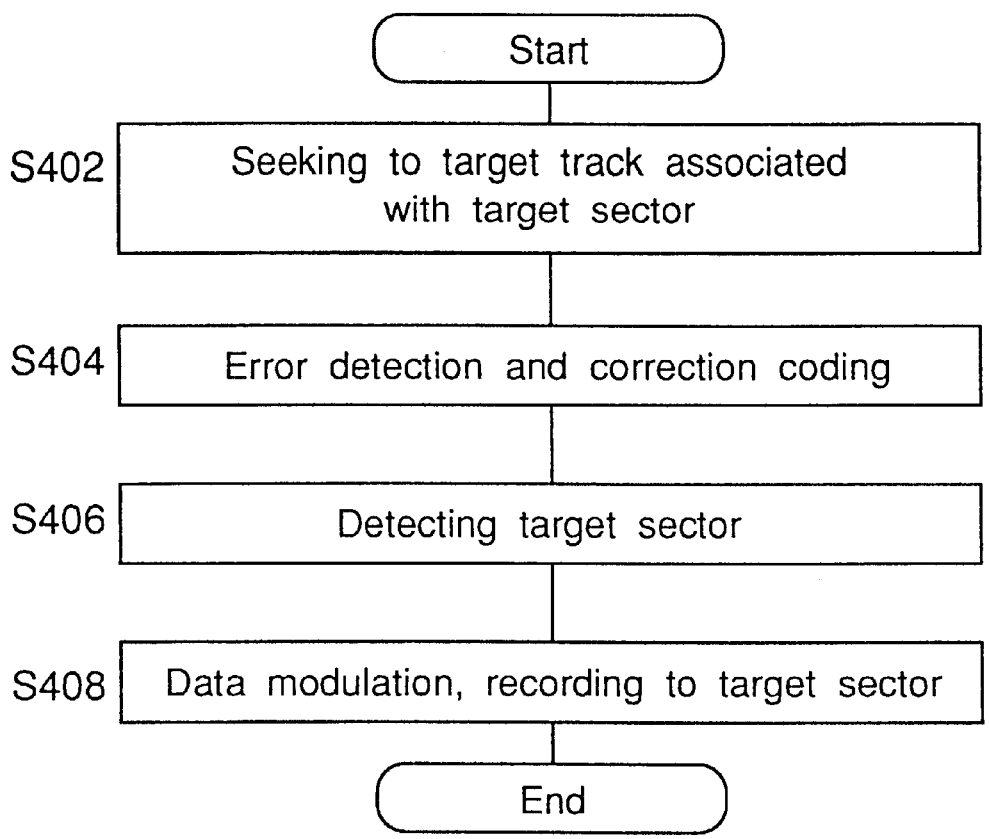
FIG. 10 is a flow chart showing the detailed operation of the recording control step shown in FIG. 8.

The operation of the control CPU 18 in the recording control step #400 in FIG. 8 is described next with reference to FIG. 10.

At step S402, the control CPU 18 controls the focus tracking controller 17 in a seek operation for moving the optical head 10 to the target track associated with the target sector to be read, and the procedure steps to step S404. In this seek operation, focus tracking controller 17 is controlled to move the optical head 10 to the target track associated with the target sector to be read, and track the light beam to the target track.

At step S404, the control CPU 18 controls the error detector and corrector 13 to error detection and correction code a 16 sector block of recording data twice, generating a product code, and the procedure steps to step 5406. During this error detection and correction coding process, the recording data from the host computer is error detection and correction coded by the error detector and corrector 13, and the coded data is stored to the buffer RAM 14.

At step S406, the address recorded to the ID part of the sector is reproduced by the modulator/demodulator 12 and compared with the address of the target sector to detect the target sector, and the procedure steps to step S408.

At step S408, the error detection and correction coded data is digitally modulated by the modulator/demodulator 12, recorded to the data recording area UD of the detected target sector, and the procedure then ends.

The operation of the control CPU 18 in the target address detection step #300 in FIG. 8 is described next with reference to FIG. 11.

At step S310, the primary defect list PDL recorded to both the lead-in area LiA and lead-out area LoA is reproduced and stored to the buffer RAM 14. The procedure then steps to step S320.

At step S320 the address is converted for the slipping method based on the content of the reproduced primary defect list PDL, obtaining a sector address PADR based on the primary defect list PDL from the address LADR requested by the host. The procedure then steps to step S330.

At step S330, the secondary defect list SDL recorded to both the lead-in area LiA and lead-out area LoA is reproduced and stored to the buffer RAM 14. The procedure then steps to step S340.

At step S340, the address is converted for the linear replacement method based on the content of the reproduced secondary defect list SDL, obtaining a target address TADR for reproduction or recording from the PADR address. The procedure then ends.

The operation of the control CPU 18 in step S320 of FIG. 11 when converting an address for the slipping method based on the PDL is described further below with reference to FIG. 12.

At step S321, the address of a specified leading sector in the zone ZN with which the sector of address LADR is associated is detected, and substituted for address ZADR. The procedure then advances to step S323. That is, the first address in the zone to which the sector of address LADR belongs is set as address ZADR. Note that ZADR is uniformly determined in each zone according to a specific format.

The defective sector count m, which is the number m (where m is an integer) of sectors in the list of defective sector addresses stored to the primary defect list PDL with an address greater than or equal to ZADR and less than or equal to LADR, is determined in step S323, and the procedure steps to step S325. More specifically, the number q of defective sectors in the related zone up to the sector of address LADR is determined. As a result, the sector of address LADR is offset the number m of defective sectors by the sector unit slipping operation.

At step S325, it is determined whether the defective sector count m is 0. If the defective sector count m is not 0, that is, if defective sectors are present, a no is returned and the procedure steps to step S327. That is, it is determined, based on the value of the defective sector count m, whether LADR conversion due to sector slipping is necessary.

At step S327, LADR+1 is substituted for ZADR, LADR+m is substituted for LADR, and the procedure returns to step S323. That is, ZADR+1 is substituted for ZADR, and LADR+m is substituted for LADR, for determining whether a defective sector is present between the sector at address LADR and the offset sector at LADR+m. The steps following the defective sector detection step S323 are then repeated until at step S325 m=0.

However, if step S325 returns no, that is, the defective sector count m is 0 and it is thus determined that there are no defective sectors, the procedure steps to step S329.

At step S329, LADR is substituted for PADR, and the procedure ends. More specifically, LADR is directly substituted for PADR because there are no defective sectors as determined by m=0.

Figure 11:
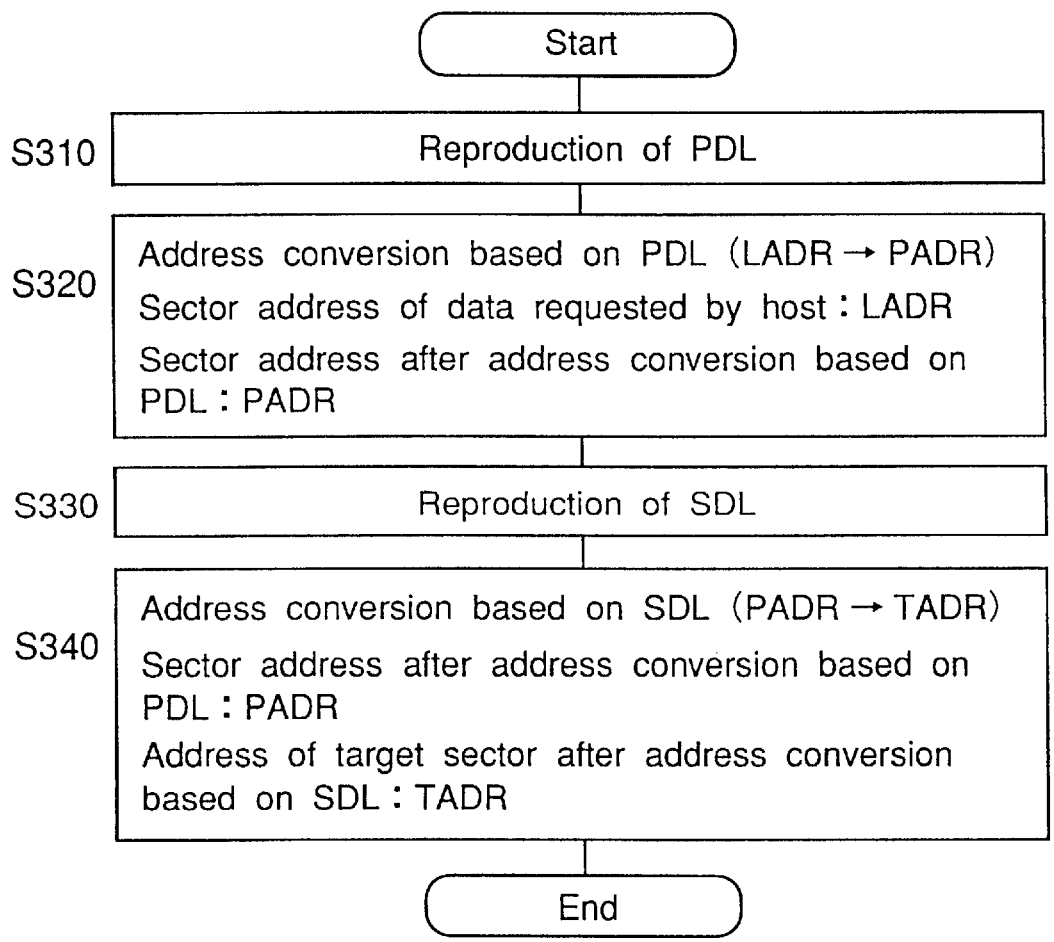
FIG. 11 is a flow chart showing the detailed operation of the target address extraction step shown in FIG. 8.
Figure 12:
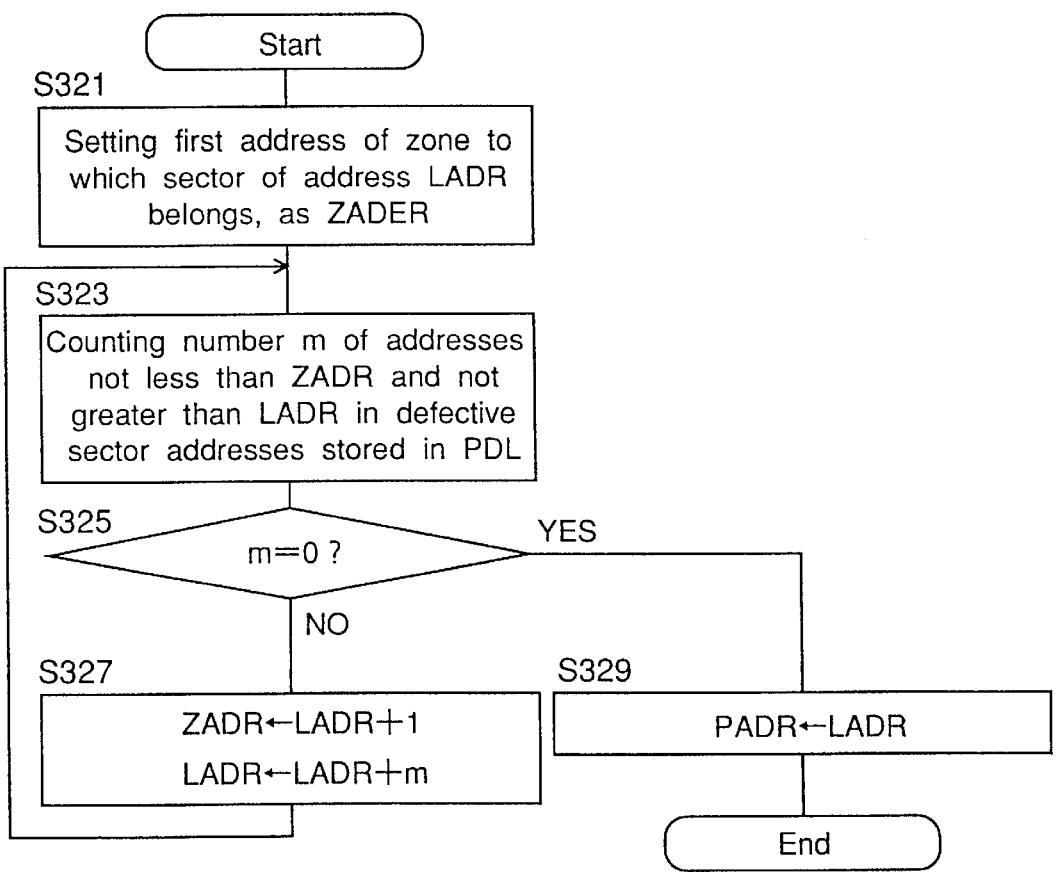
FIG. 12 is a flow chart showing the detailed operation of the PDL-based address conversion step shown in FIG. 11.
Figure 13:
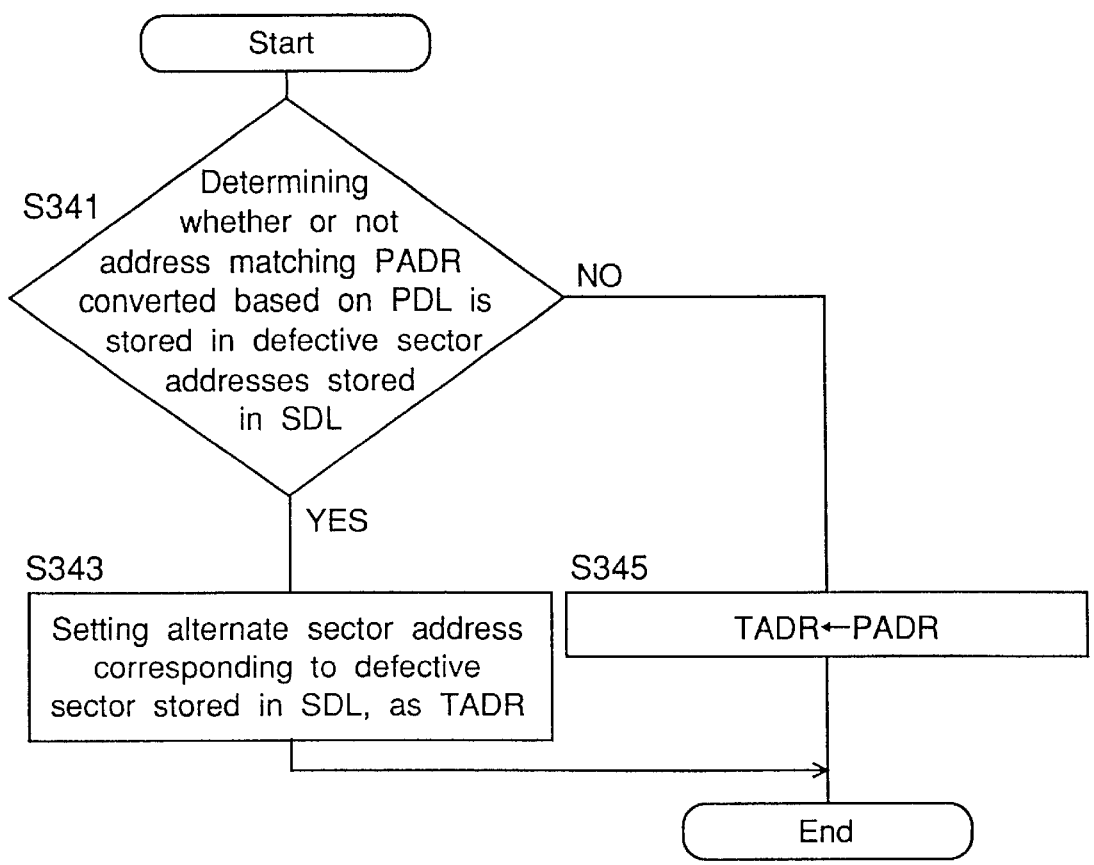
FIG. 13 is a flow chart showing the detailed operation of the SDL-based address conversion step shown in FIG. 11.

The operation of the control CPU 18 in the linear replacement method address conversion step S340 based on the SDL shown in FIG. 11 is described next with reference to FIG. 13.

In step S341, it is determined whether an address matching the PADR address converted according to the primary defect list PDL is stored in the defective sector addresses stored to the secondary defect list SDL. If the result is no, that is, if the same address is not stored in the secondary defect list SDL, the procedure steps to step S345.

At step S345, the PADR address is directly substituted for the recording and reproduction target sector address TADR, and the procedure ends.

If step S341 returns yes, that is, if the PADR address is recorded as a defective sector address in the SDL, the procedure steps to step S343.

At step S343, the corresponding alternate sector address is substituted for TADR, and the procedure ends.

Figure 14:
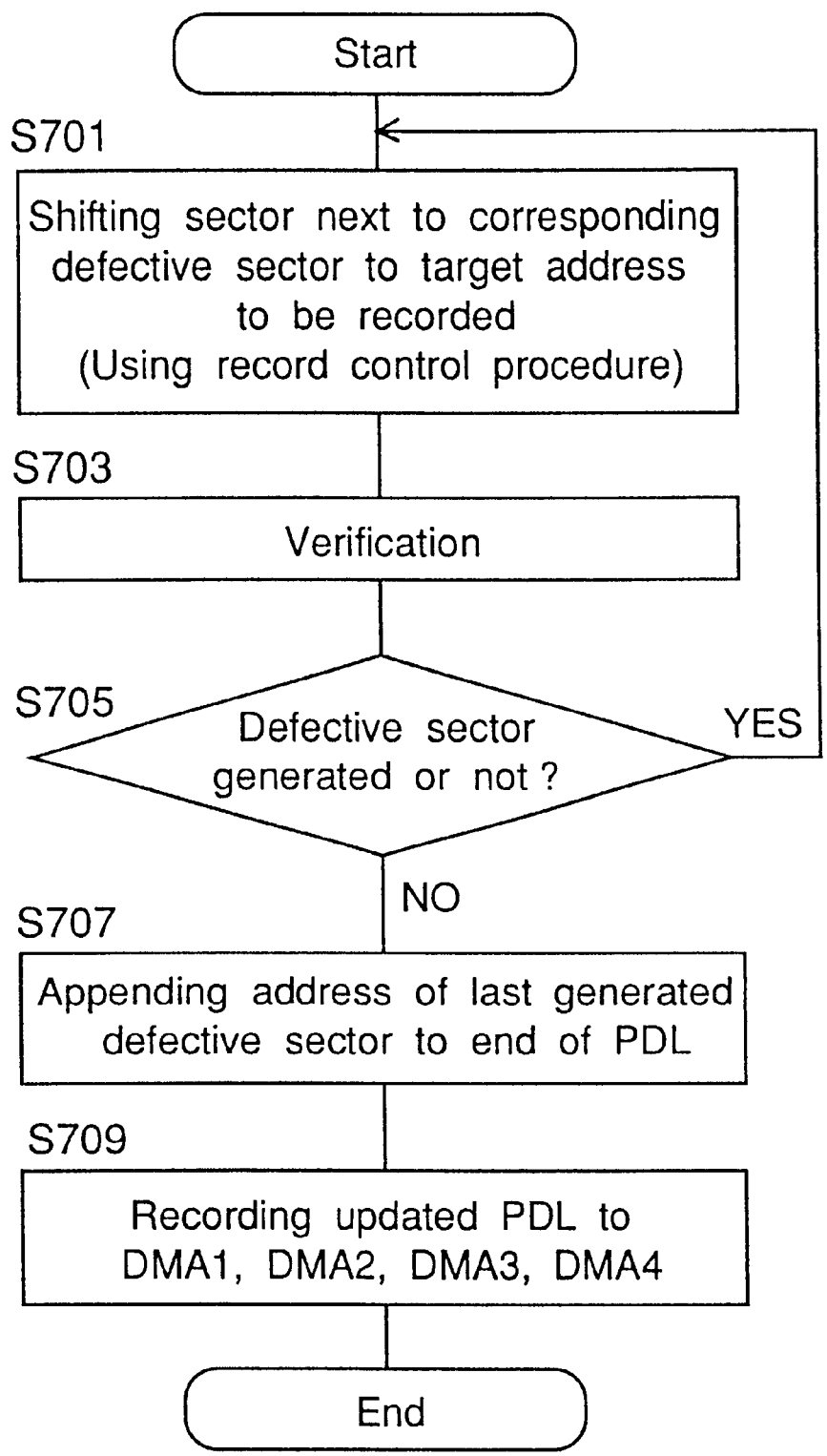
FIG. 14 is a flow chart showing the detailed operation of the sector substitution processing step shown in FIG. 8 according to a first embodiment.

The operation of the control CPU 18 when the sector substitution process step #700 in FIG. 8 is applied using the slipping method is described next with reference to FIG. 14.

At step S701, the data stored to the defective sector is shifted to the next sector and recorded in a slipping recording operation, and the procedure steps to step S703. That is, when the sector substitution process is performed in sector units using the slipping method, the data from the defective sector is alternately recorded to the next sector after the defective sector.

The verification process performed in step S703 reproduces the data recorded to the slip-recorded sector to confirm that the data is correctly recorded, and then the procedure steps to step S705. Note that the verification process performed in this step is the same as that performed in step #500 in FIG. 8.

Step S705 is a defective sector discrimination step whereby it is determined whether the sector to which data is shifted from a defective sector by the slipping method is itself a defective sector. As such, the operation of step S705 is the same as that of step #600 in FIG. 8. A no is returned when the sector is normally recorded by the slipping method, and the procedure steps to step S707.

The address of a newly detected defective sector is appended to the end of the PDL in step S707, and then the procedure steps to step S709.

The updated PDL is then multi-recorded to DMA1, DMA2, DMA3, and DMA4 in step S709, and the procedure ends.

If at step S705 a yes is returned because the sector was not normally recorded by the slipping method, the procedure loops back to step S701. In other words, whether the alternatively recorded sector could be correctly recorded or not is determined by the verification process step S703 and the defective sector discrimination step S705, and the slip recording step S701, verification process step S703, and defective sector discrimination step S705 are repeated until normal recording is successfully confirmed.

If the sector is normally recorded, the address of any newly occurring defective sector is appended to the end of the PDL in the PDL registration step S707. The PDL updated in the PDL registration step is then recorded multiple times, that is, to the DMA1, DMA2, DMA3, and DMA4 of the lead-in area LiA and lead-out area LoA.

Figure 15:
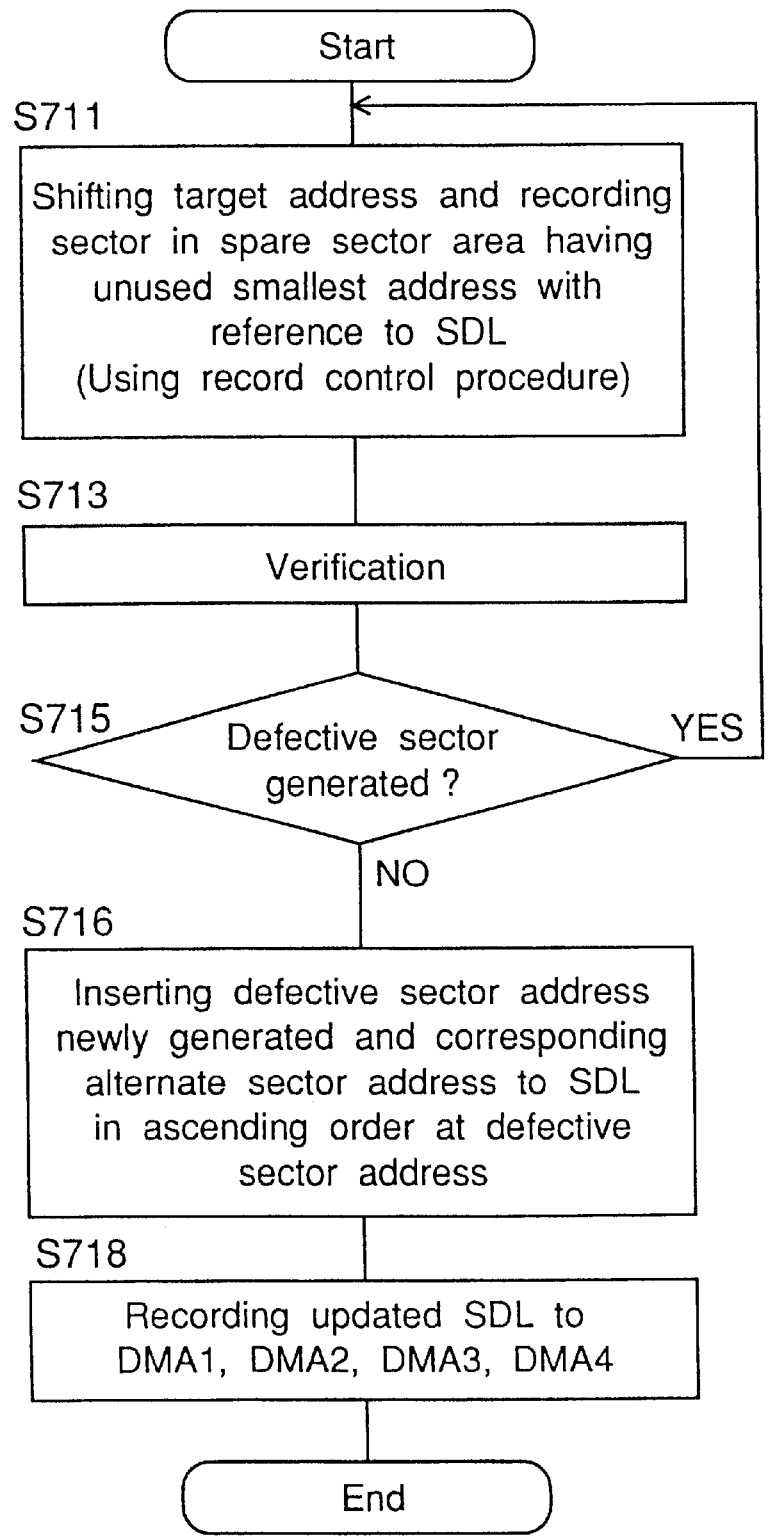
FIG. 15 is a flow chart showing the detailed operation of the sector substitution processing step shown in FIG. 8 according to a second embodiment.

The operation of the control CPU 18 when the sector substitution process step #700 in FIG. 8 is applied using the linear replacement method is described next with reference to FIG. 15.

At step S711, the data stored to the defective sector is replacement recorded to an alternate sector in the spare sector area ASS at the lowest unused address in the same zone ZN, and the procedure steps to step S713.

The verification process performed in step S713 reproduces the data recorded to the replacement recorded sector to confirm that the data is correctly recorded, and then the procedure steps to step S715. Note that the verification process performed in this step is the same as that performed in step #500 in FIG. 8.

Step S715 is a defective sector discrimination step whereby it is determined whether the sector to which data is recorded from a defective sector by the replacement method is itself a defective sector, and is the same as step #600 in FIG. 8. A no is returned when the sector is normally recorded by the replacement method, and the procedure steps to step S716.

At step S716, the address of the defective sector to which recording was first attempted, and the address of the corresponding alternate sector, are inserted as a pair to the secondary defect list SDL in ascending order at the address of the defective sector. The procedure then steps to step S718.

The updated secondary defect list SDL is then multi-recorded to DMA1, DMA2, DMA3, and DMA4 in step S718, and the procedure ends.

When the sector substitution process is implemented in sector units using a linear replacement method, the control CPU 18 alternately records the data from the defective sector to an unused alternate sector in the replacement recording step S711. Next, it determines whether the alternately recorded sector was correctly recorded in the verification process step S713 and the defective sector discrimination step S715, and the replacement recording step S711, verification process step S713 and defective sector discrimination step S715 are repeated until normal recording is successfully confirmed.

If the sector is normally recorded, the address of the defective sector to which recording was first attempted, and the address of the corresponding alternate sector, are inserted as a pair to the secondary defect list SDL in ascending order at the defective sector address in the SDL registration step S716, and the procedure ends.

Finally, the updated secondary defect list SDL is recorded multiple times, that is, to the DMA1, DMA2, DMA3, and DMA4 of the lead-in area LiA and lead-out area LoA in the SDL registration step S718.

A substitution process whereby one alternate sector is consumed for one defective sector is thus accomplished using a slipping method and a linear replacement method.

Ability for Application in Industry

As described above, a recording defect substitution method for a disc-shaped recording medium, and a disc-shaped recording medium recording and reproducing apparatus according to the present invention minimize the alternate area for defective sectors in high recording density disc-shaped recording media in which burst-mode recording and reproduction errors occur easily, and can thereby highly efficiently use the recording area of a disc-shaped recording medium.

What is claimed is:

1. A disc-shaped recording medium recording apparatus for recording data in a disc-shaped recording medium (8) having a plurality of sectors, said disc-shaped recording medium recording apparatus comprising:

a coding means (13) for coding the data into error detection and correction coded data aligned in both row and column directions, and segmenting said error detection and correction coded data into a plurality of segment coded data;

means (10, 11, 12) for recording each of said plurality of segment coded data to a sector in a first recording area (ADS) of the disc-shaped recording medium (8);

defective sector discrimination means (#500, #600) for determining whether a sector is a defective sector by reproducing said segment coded data recorded in said sector; and first defective sector substitution means (35, #700), which, in the case where said sector is determined to be a defective sector, skips only the defective sector and records said segment coded data in and after the defective sector to the following sectors in the first recording area (ADS) by successively slipping one by one sector, second defective sector substitution means (35, #700), which, records said segment coded data in the defective sector to a sector in a second recording area (ASS) for linear replacement, wherein in the case where the data is recorded to the disc-shaped recording medium (8) for the first recording operation, the first defective sector substitution means is used for the slipping substitution.

2. The disc-shaped recording medium recording apparatus according to claim 1, wherein after using the first defective sector substitution means, the data is recorded to the disc-shaped recording medium (8) using the second defective sector substitution means.

3. The disc-shaped recording medium recording apparatus according to claim 1, wherein the defective sector discrimination means (#500, #600) determines a sector to be a detective sector when address information (ID) pre-recorded to said sector cannot be correctly reproduced.

4. The disc-shaped recording medium recording apparatus according to claim 1, wherein the defective sector discrimination means (#500, #600) determines a sector to be a defective sector by decoding only the error detection and correction coded data, which can be decoded using only data recorded to said sector.

5. The disc-shaped recording medium recording apparatus according to claim 1, wherein the defective sector discrimination means (#500, #600) determines a sector to be a defective sector when data recorded to said sector can not be correctly reproduced.

6. A disc-shaped recording medium recording method for recording data in a disc-shaped recording medium having a plurality of sectors, said disc-shaped recording medium recording method comprising:

coding the data into error detection and correction coded data aligned in both row and column directions;

segmenting said error detection and correction coded data into a plurality of segment coded data;

recording each of said plurality of segment coded data to a sector in a first recording area (ADS) of the disc-shaped recording medium;

determining (#500, #600) whether a sector is defective sector by reproducing said segment coded data recorded in said sector; and in the case where said sector is determined to be a defective sector, skipping only the defective sector and recording said segment coded data in and after the defective sector in the following sectors of the first recording area (ADS) by successively slipping one by one sector (#700), subsequently recording said segment coded data in the defective sector to a sector in a second recording area (ASS) for linear replacement, wherein in the case where the data is recorded to the disc-shaped recording medium (8) for the first recording operation, the first defective sector substitution is conducted for the slipping substitution.

7. The disc-shaped recording medium recording method according to claim 6, wherein after using the first defective sector substitution, the data is recorded to the disc-shaped recording medium (8) using the second defective sector substitution.

* * * * *

UNITED STATES PATENT AND TRADEMARK OFFICE
CERTIFICATE OF CORRECTION

PATENT NO. : 6,496,455 B1
DATED : December 17, 2002
INVENTOR(S) : Yuji Takagi et al.

It is certified that error appears in the above-identified patent and that said Letters Patent is hereby corrected as shown below:

Column 7,
Line 59, delete the word "tdo" and insert in its place the word -- to --.

Column 8,
Line 51, delete the phrase "and in which the" and insert in its place the phrase -- and the --.

Column 9,
Line 47, delete the word "an" and insert in its place the word -- and --.

Column 11,
Line 9, delete the punctuation "." (period) after the word "is".

Column 12,
Line 12, delete the number "5406" and insert in its place the number -- S406 --.

Signed and Sealed this

Twenty-second Day of July, 2003

JAMES E. ROGAN
*Director of the United States Patent and Trademark Office*